(12) United States Patent
Lin

(10) Patent No.: US 6,813,325 B1
(45) Date of Patent: Nov. 2, 2004

(54) SYSTEM AND METHOD TO REDUCE TRANSMIT WANDER IN A DIGITAL SUBSCRIBER LINE

(75) Inventor: Jung-Lung Lin, Holmdel, NJ (US)

(73) Assignee: Globespanvirata, INC, Red Bank, NJ (US)

( * ) Notice: Subject to any disclaimer, the term of this patent is extended or adjusted under 35 U.S.C. 154(b) by 747 days.

(21) Appl. No.: 09/746,873

(22) Filed: Dec. 22, 2000

Related U.S. Application Data

(60) Provisional application No. 60/171,385, filed on Dec. 22, 1999.

(51) Int. Cl.[7] .................................................. H04L 7/00
(52) U.S. Cl. ........................ 375/354; 375/355; 375/293
(58) Field of Search ................................ 375/354, 355, 375/261, 357, 260, 222, 220, 371, 366, 293, 343, 259, 240.21; 370/505, 516, 503, 485, 506; 324/415

(56) References Cited

U.S. PATENT DOCUMENTS

| | | | | |
|---|---|---|---|---|
| 5,539,785 A | * | 7/1996 | Burch et al. ................. | 375/371 |
| 5,757,869 A | * | 5/1998 | Sands et al. ................. | 375/366 |
| 6,101,196 A | * | 8/2000 | Murakami .................... | 370/516 |
| 6,195,385 B1 | * | 2/2001 | Aiyagari et al. ............ | 375/222 |
| 6,359,933 B1 | * | 3/2002 | Aslanis et al. ............... | 375/260 |
| 6,489,773 B1 | * | 12/2002 | Benco et al. ................ | 324/415 |

OTHER PUBLICATIONS

"Generalized Sliding Window Algorithm with Applications to Frame Synchronization", S.M. Pan and D.H. Madill, Military Communications Conference, 1996. MILCOM '96, Conference Proceedings, IEEE, vol.: 3, Oct. 21–24, 1996, pp. 796–800 vol. 3.*

* cited by examiner

*Primary Examiner*—Stephen Chin
*Assistant Examiner*—Ted Wang
(74) *Attorney, Agent, or Firm*—Thomas, Kayden, Horstemeyer & Risley

(57) ABSTRACT

A system and method for reducing transmit carrier wander in a DSL communication system are disclosed. A network timing reference unit provides an automatic embedded solution for synchronizing DSL frames to an external communication system reference clock. The network timing reference unit applies or removes bits to adjust the length of a DSL frame in response to a sliding window state table. A sliding window is selected in response to the relative position of the DSL frame to a system clock reference point over a number of DSL frames. A network timing reference unit in accordance with the present invention may comprise a counter, a network timing latch, a synchronization word detector, a DSL frame latch, a lead/lag comparator, a sliding window buffer, a sliding window state table, a DSL frame state recorder, and a sensitivity buffer. The present invention provides a method for reducing transmit carrier wander in a DSL transceiver. In its broadest terms, the method can be described as: receiving a network clock and a DSL data stream comprising a plurality of frames; identifying a reference point on the network clock signal; identifying a DSL frame reference point; recording the relative position of the DSL frame reference point to the network clock reference point; performing a bit-manipulation responsive to the relative reference positions and a current window position; and adjusting the current window position in response to a consistent relative reference position between the network clock and DSL frame reference points.

32 Claims, 6 Drawing Sheets

SYSTEM AND METHOD TO REDUCE TRANSMIT WANDER IN A DIGITAL SUBSCRIBER LINE

CROSS-REFERENCE TO RELATED APPLICATIONS

The present application claims the benefit of co-pending U.S. provisional patent application, issued Ser. No. 60/171,385, and filed Dec. 22, 1999, which is hereby incorporated by reference in its entirety.

FIELD OF THE INVENTION

The present invention relates generally to data communications, and more particularly, to a system and method for achieving reduced timing wander in a digital subscriber line (DSL) communication system.

BACKGROUND OF THE INVENTION

In the field of data communications a transceiver, or modem, is used to convey information from one location to another. Digital subscriber line (DSL) technology now enables DSL transceivers to more rapidly communicate data than previously possible with purely analog modems. DSL transceivers communicate by modulating a baseband signal carrying encoded digital data, converting the modulated digital data signal to an analog signal, and transmitting the analog signal over a conventional copper wire pair using techniques that are known in the art. These known techniques include mapping the information to be transmitted into a multi-dimensional multi-level signal space constellation and slicing the received constellation to recover the transmitted information.

The constellation can include both analog and digital information or only digital information.

In the above mentioned communications environment, a central office DSL transceiver is located at a telephone company central office location. Connected to the DSL transceiver via a conventional copper wire pair is a suitably configured remote DSL transceiver. The remote transceiver resides at a location commonly referred to as a customer premise. Before the central office transceiver can exchange information with the remote transceiver, clock timing and synchronization between the central office transceiver and a network master clock should be established.

Timing and synchronization are fundamental to any digital transmission and switching network. In a digital transmission system, timing is encoded with the transmitted signal using a network master clock, such as a T1 or E1 clock as a reference clock. As such, the central office transceiver must recover system timing and synchronization from this system clock. Once frequency synchronization between the central office transceiver and the network clock is achieved, the central office transceiver can identify frame boundaries of downstream data signals designated for further transmission to the remote transceiver. In addition, the central office transceiver can identify frame boundaries of upstream data signals received from the remote transceiver that may be designated for further transmission to other network connected devices.

In the aforementioned communications environment, synchronization is provided in a master-slave relationship such that the network timing (e.g., a T1 clock) is the master allowing it to provide timing information to all the slave data transmission systems connected to the network. Each remote transceiver connected to the network must be synchronized to the network system clock as provided by the central office transceiver.

In order to achieve higher data rates with a fixed distance or with a given non-rate adaptive DSL transceiver technology, two or more DSL lines may be combined. By way of example, high-speed DSL (HDSL) technology uses two pairs of twisted copper wire, HDSL transceivers, multiplexers and demultiplexers at each end of a communication link to provide T1 capacity service over two pairs of twisted copper conductors commonly used in local subscriber loops within the PSTN. The European version of HDSL binds three pairs of twisted copper conductors and their related transceivers, multiplexers, and demultiplexers to provide E1 capacity service.

The prior art HDSL link illustrated in FIG. 1 is offered by way of example to highlight various interface equipment that may be used to provide a T1 capacity link between a PSTN central office (CO) and a customer premise (CP). In this regard, FIG. 1 illustrates a basic HDSL network link architecture. As illustrated in FIG. 1, a HDSL network link 10 may comprise equipment located within a CO 20, equipment located within a CP 40, and HDSL interface equipment 30 as required within each location to transfer data to and from an ATM switch (not shown). More specifically, the central office 20 may comprise a plurality of trunk line interfaces 21, 23, and 25, herein labeled analog trunk card, digital trunk card, and optical trunk card, respectively; a PSTN digital switch 22; and a plurality of HDSL termination units—central office (HTU-C) 24a, 24b, 24c, . . ., and 24x. As illustrated in FIG. 1, each HTU-C 24a, 24b, 24c, . . . , and 24x may be coupled via two twisted pair telephone transmission lines 31a, 31b to a dedicated HDSL termination unit—remote (HTU-R) 44 (one shown for simplicity of illustration).

As also illustrated in FIG. 1, the combination of the HTU-C 24c, the two twisted pair telephone transmission lines 31a, 31b, and the HTU-R 44 may comprise the HDSL interface equipment 30. As further illustrated in FIG. 1, the CP 40 may comprise a customer interface 46 and customer premise equipment 48 which may contain one or more computing devices (not shown).

It is significant to note that downstream and upstream data transmissions that are transmitted across the HDSL network link 10 of FIG. 1 must be processed at the HTU-Rs 44 and the HTU-Cs 24 in order to ensure that data transmissions are inverse multiplexed and reconstructed into their original configuration. Each of the HTU-Rs 44 and the HTU-Cs 24 may further comprise a transceiver and a mapper (both not shown). At one end of the HDSL communications network 10, a first mapper may be used to inverse multiplex or distribute a data transmission across multiple transmit media (i.e., the twisted pair telephone transmission lines 31a, 31b). At the opposite or receiving end of the HDSL communications network 10, a second mapper may be used to multiplex or reconstruct the original data transmission. By way of example, a downstream data transmission may be inverse multiplexed such that a portion of the data is transmitted via the HTU-C 24c across a first twisted pair telephone transmission line 31a with the remaining portion of the data transmission sent via a second twisted pair telephone transmission line 31b. After the first and second portions of the data transmission are received and reconstructed by the HTU-R 44, the first and second portions of the original data stream may be multiplexed before being forwarded to the customer interface 46 and the CPE 48. Often the customer interface 46 is implemented with a router having a port coupled with one or more HTU-Rs 44 and or other network interface devices.

A common technique for achieving timing synchronization between the network clock and the central office transceiver is based upon the use of an external framer, which performs a bit-stuffing operation. In this arrangement the aggregate bit stream has a higher data rate than the input data rate from the network. This data rate relationship accommodates the additional stuffing and framing bits. Bits are stuffed (inserted) or deleted (removed) from the incoming data stream until a clock rate derived from the incoming data stream is equal to that of the input data rate from the network. This bit stuffing operation permits the transceiver to derive a local clock with a frequency that tracks the frequency of the network clock.

Presently, the add/delete or bit-stuffing mechanism synchronizes a customer interface and a transmit carrier by determining the relative position of a DSL frame reference point to a periodic customer reference point and responding accordingly. When the DSL frame reference point leads the customer reference point, a timing field in the frame is set to 4 bits. Otherwise, the timing field is set to 0 bits. The present bit-stuffing mechanism generates a significant wander in the DSL frame with respect to the customer reference point. The wander is not removable. Accordingly, it is desired to provide a system and method that efficiently and accurately reduces timing reference wander in a DSL based communications system.

SUMMARY OF THE INVENTION

In light of the foregoing, the present invention uses a sliding window algorithm that may be implemented on a digital signal processor (DSP) to reduce timing reference wander in a DSL communication system. The system and method of the present invention provide for the synchronization of one or more derived clocks to a network system clock without extensive modification or additional external circuit components.

The system may be implemented in hardware or with a combination of firmware and software that uses a state table to apply designated stuff/delete bits for each of a plurality of sliding windows. The sliding windows may be controlled by monitoring the relative position of the DSL frame to the network system clock and selecting the active window in response to the relative position over a number of DSL frames. The configuration ensures that after initial acquisition, the locally generated clock and all clock signals derived from the local clock signal dynamically track any frequency and phase variation of the external reference clock.

In a preferred embodiment, a network timing reference clock may be configured to drive a counter, which may be used to trigger a first latch upon receiving X clock signal transitions. The first latch may be reset after an appropriate delay. Concurrently, a selected reference point within a DSL frame being processed in a DSL transceiver may be used to trigger a second latch. A comparator may determine from the condition of the first latch at the point the second latch is triggered whether the DSL frame is leading or lagging the network timing reference point. A result from the comparator may be used in conjunction with a sliding window identifier to select an appropriate set of delete or stuffing bits from a sliding window state table. Furthermore, a DSL frame state recorder may be configured to monitor the relative position of the DSL frame reference point with regard to the network timing reference clock over a variable number of frames and responsively select an adjacent sliding window if the DSL frame reference point leads or lags the network timing reference point for M consecutive frames.

A network timing reference unit in accordance with the present invention may comprise a counter, a network timing latch, a synchronization word detector, a DSL frame latch, a lead/lag comparator, a sliding window buffer, a sliding window state table, a DSL frame state recorder, and a sensitivity buffer. The present invention provides a method for reducing transmit carrier wander in a DSL transceiver. In its broadest terms, the method can be described as: receiving a network clock and a DSL data stream comprising a plurality of frames; identifying a reference point on the network clock signal; identifying a DSL frame reference point; recording the relative position of the DSL frame reference point to the network clock reference point; performing a bit-manipulation responsive to the relative reference positions and a current window position; and adjusting the current window position in response to a consistent relative reference position over time.

Other features and advantages of the present invention will become apparent to one skilled in the art upon examination of the following drawings and detailed description. It is intended that all such additional features and advantages be included herein within the scope of the present invention, as defined in the appended claims.

BRIEF DESCRIPTION OF THE DRAWINGS

The accompanying drawings incorporated in and forming a part of the specification illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views. In the drawings.

DETAILED DESCRIPTION OF THE PREFERRED EMBODIMENT

Figure 1:
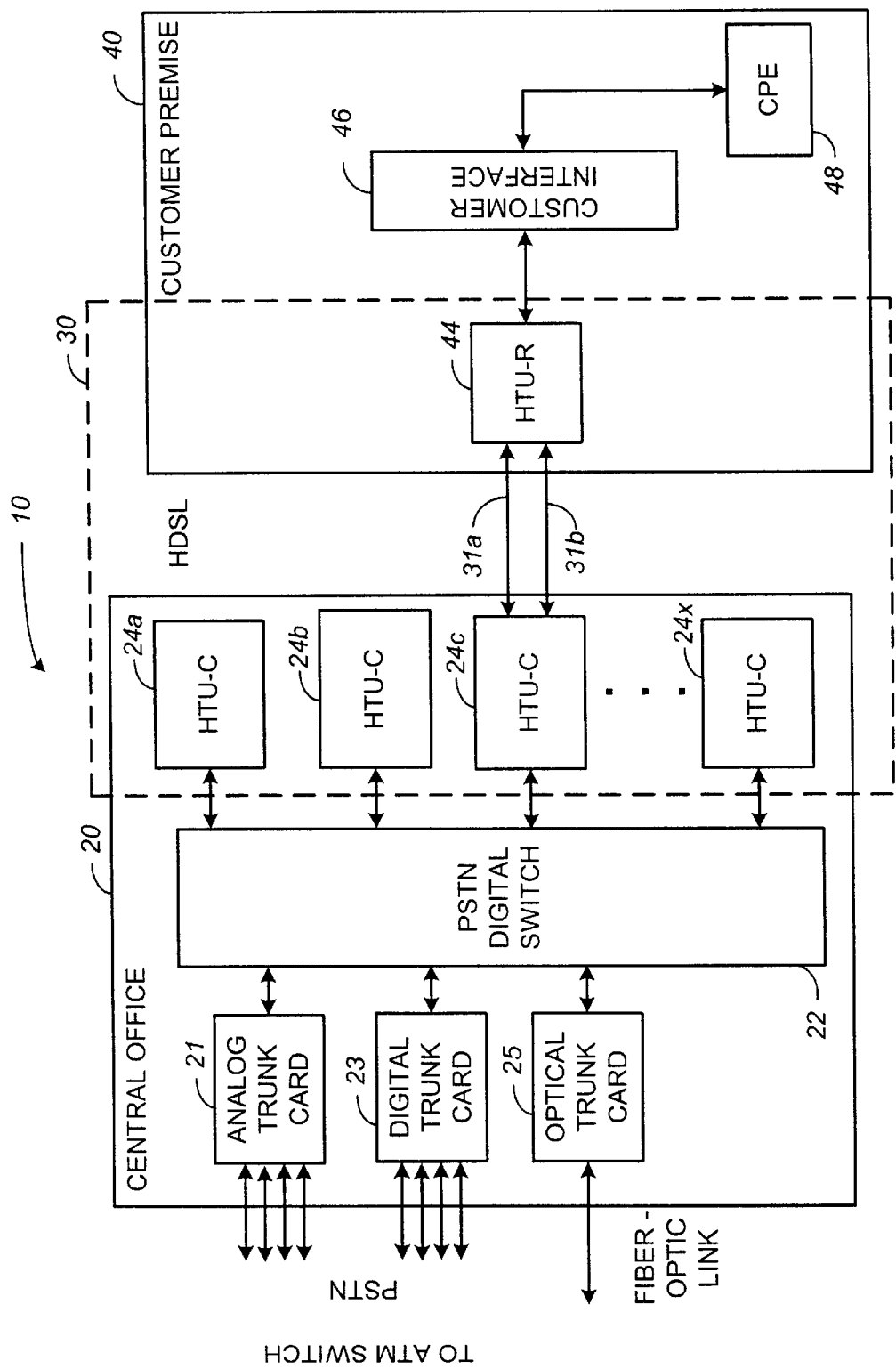
FIG. 1 is a schematic diagram illustrating a prior art HDSL communication system.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

The present invention can be implemented in software, hardware, or a combination thereof. In the preferred embodiment, the elements of the present invention are implemented in hardware within the various circuit components of an application specific integrated circuit (ASIC) such as a suitably configured digital signal processor (DSP). In an alternative embodiment, a network timing reference unit in accordance with the present invention may be implemented in software that is stored in a memory and that configures and drives a suitable DSP. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method.

While the foregoing preferred embodiment illustrates the invention in the context of a high-bit-rate DSL (HDSL) remote transceiver, the features of the present invention are applicable to DSL central office transceivers and like devices configured to support HDSL2, SDSL, G.SHDSL, and SHDSL2 communication protocols. For that matter, the features of the present invention are applicable to any master-slave timing application where a device synchronizes one or more data streams using a protocol that permits bit-stuffing to match a data stream to a master clock. Those skilled in the art will appreciate that the system and method for reducing transmit carrier wander in accordance with the present invention is applicable and preferable in both the central office and remote transceiver equipment.

Figure 2:
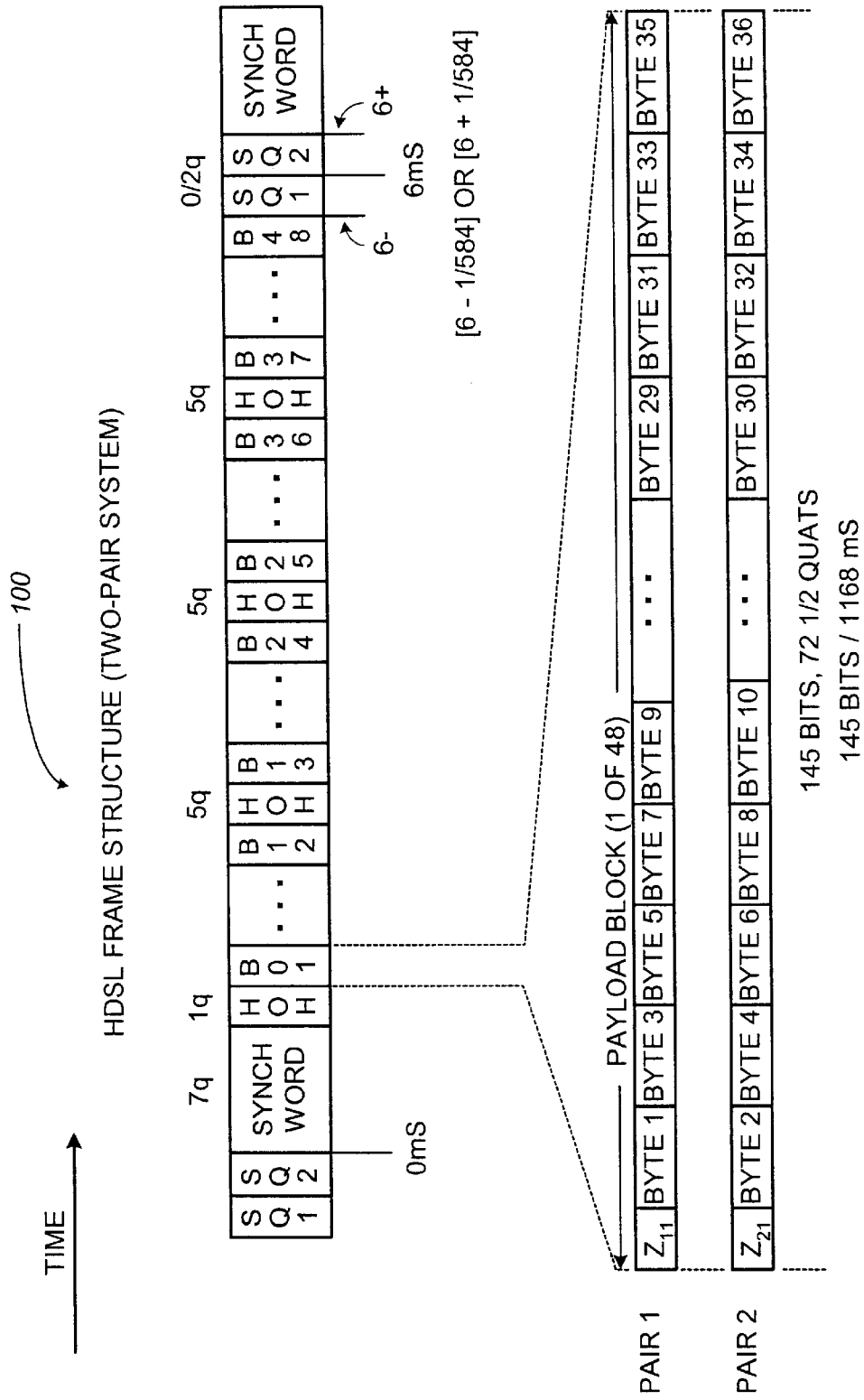
FIG. 2 is a schematic diagram illustrating the standard HDSL frame structure for data streams communicated across the HDSL communication system of FIG. 1.

Before presenting the teachings and concepts of a network timing reference unit in accordance with the present invention, FIG. 2 is presented to illustrate a standard protocol for transmitting data in a synchronous DSL communication system. In this regard, reference is directed to FIG. 2, which illustrates a HDSL frame structure as defined by the European Telecommunications Standards Institute (ETSI) in technical specification 101 135 V1.5.1 (1998-11) entitled, *Transmission and Multiplexing (TM); High bit-rate Digital Subscriber Line (HDSL) transmission systems on metallic local lines; HDSL core specification and applications for combined ISDN-BA and 2,048 kbit/s transmission*. In this regard, FIG. 2 illustrates the HDSL frame structure composed of quaternary symbols (quats) and the mapping of the core frame bytes to the frame structure. The frame is divided into four groups. The first group of the frame starts with a synchronization word herein labeled, "SYNCH WORD." As illustrated in FIG. 2, the synchronization word has a length of seven symbols followed by one HDSL overhead quat, "HOH," and 12 blocks of HDSL payload data, "B01 to B12." Each of the blocks of payload data consists of 72.5 quats or 145 bits. As shown in FIG. 2, the payload blocks comprise an overhead bit, $Z_{mn}$, and 18 bytes of the core frame. The overhead bits, $Z_{mn}$, identify the transmission pair and the HDSL payload block as follows: m=1, 2 indicates one of the two-pairs; n=1 to 48 is the number of the HDSL payload block in the frame. As further illustrated in FIG. 2, the odd bytes are designated for transmission via pair one (i.e., the twisted-pair telephone transmission line 31*a*), whereas the even bytes are designated for transmission via pair two.

As shown in FIG. 2, the $Z_{mn}$-bits, provide an additional overhead channel of 48 bits/frame for each HDSL transceiver system 10 (FIG. 1) at a data rate of 8 kbit/s. The first eight Z-bits, $Z_{m1}$ to $Z_{m8}$, are reserved for core applications. Bits $Z_{m1}$, $Z_{m2}$ are used for pair identification, whereas bits $Z_{m3}$ to $Z_{m8}$ are reserved for future use and are presently set to one. The Z-bits 9 to 48, $Z_{m9}$ to $Z_{m48}$, are application specific and are transparently transported through the HDSL core.

The three groups following the first group have an equivalent structure. Each of the groups consists of five HDSL overhead quats (HOH) and 12 HDSL payload blocks (B01–B12, B13–B24, B25–B36, and B37–B48) as described above. So one HDSL frame 100 consists of a synchronization word, 16 HDSL overhead quats, 48 Z-bits and 864 bytes of the core frame.

At the end of the frame, two placeholders, "SQ1" and "SQ2," are available for stuffing quats. The stuffing quats are used together; this means that either none or two of the stuffing quats are inserted into the frame, depending on relative timing with an external reference. Each stuffing quat may contain a sign bit and a magnitude bit. In accordance with the standard, the values of the stuffing quats are left as a choice to individual vendors.

As a result of the variability provided by the stuffing quats, the length of the HDSL frame is either 3,505 quats, which corresponds to 6+1/584 ms for the nominal HDSL clock frequency, or 3,503 quats, which corresponds to 6−1/584 ms. Over time the average will tend to 3,504 quats or 6 ms. It will be appreciated that the HDSL transceivers 22, 44 in a HDSL communication system 10 (FIG. 1) may evaluate the length of an incoming frame by detecting the synchronization word in the following frame and reacting accordingly.

It will be appreciated by those skilled in the art that transmit carrier wander will vary depending on the specific variety of DSL used. For example, if a three twisted-pair configuration is used, the HDSL frame will vary from 6−1/392 ms to 6+1/392 ms. For the case where one twisted-pair telephone transmission line 31 (FIG. 1) is used, the frame will vary from 6−1/1,160 ms to 6+1/1,160 ms.

Figure 3:
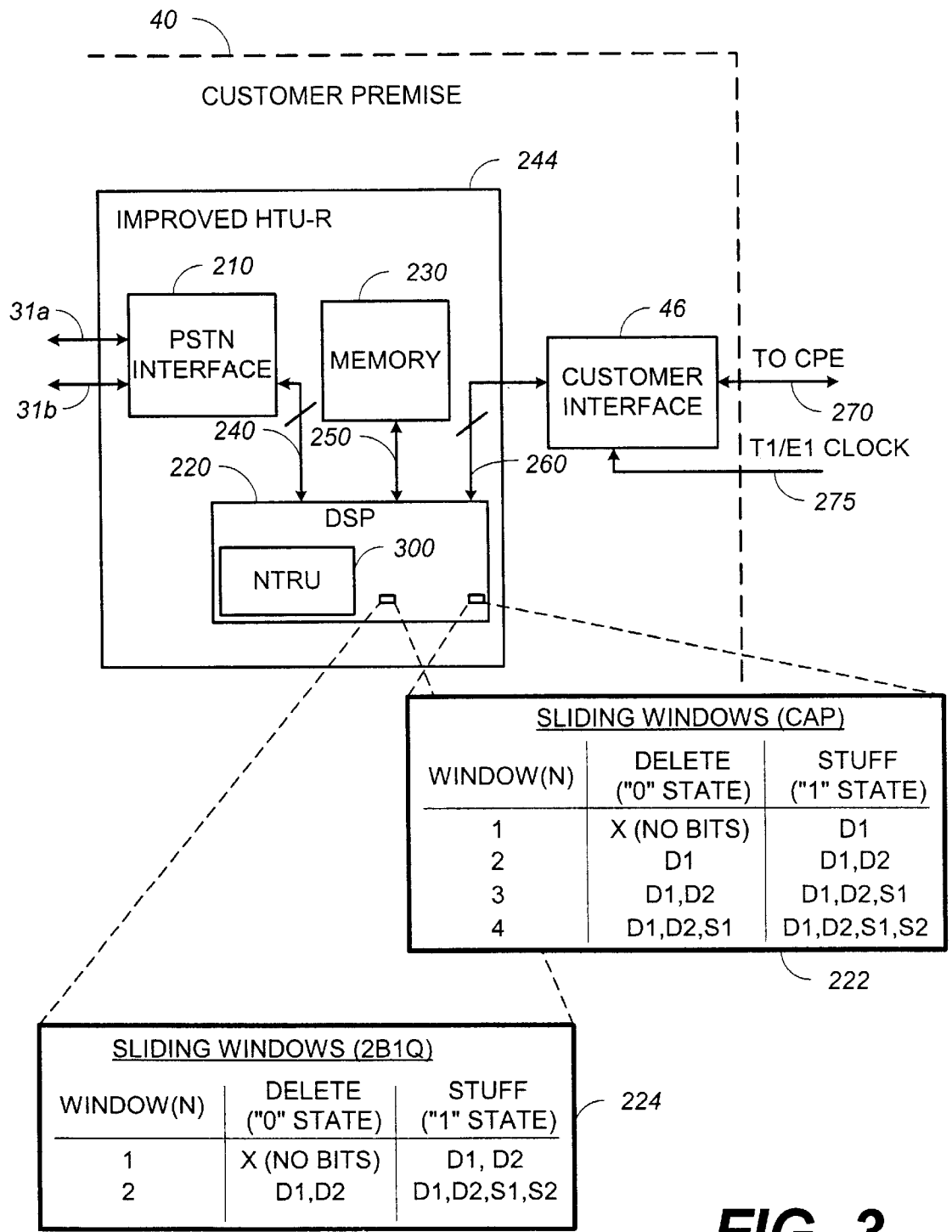
FIG. 3 is a functional block diagram illustrating an improved HDSL transmission unit in accordance with the present invention.

Having described the HDSL frame structure and the origin of the expected wander of a transmit carrier in a HDSL communication system, reference is now directed to the remaining figures which highlight the concepts and teachings of a network timing reference unit in accordance with the present invention. In this regard, reference is now directed to FIG. 3, which illustrates a functional block diagram of an improved HDSL transmission unit in accordance with the present invention. As illustrated in FIG. 3, a customer premise located HTU-R 244 in accordance with the present invention may be integrated with a customer interface 46 to complete a HDSL communication link between a CO 20 and CPE 48 at a CP 40 (FIG. 1). As shown in FIG. 3, the improved HTU-R 244 in accordance with the present invention may receive and transmit digitally encoded data transmissions that may be formatted in accordance with the HDSL frame of FIG. 2. As previously described in regard to FIG. 1, the data transmissions may be sent and received along a pair of twisted-pair telephone transmission lines 31*a*, 31*b*. As illustrated in FIG. 3, the twisted-pair telephone transmission lines 31*a*, 31*b* may be communicatively coupled to the improved HTU-R 244. As also illustrated in FIG. 3, the improved HTU-R 244 may be communicatively coupled via at least one bi-directional data bus 260 with a customer interface 46. The customer interface 46 may be further configured with at least one bi-directional data interface 270 to complete a data communications link between the improved HTU-R 244 and the CPE 48 (FIG. 1). As is further illustrated in FIG. 3, the customer interface 46 may receive a timing reference signal 275. It will be appreciated that the timing reference signal 275 may take the form of a T1 or E1 clock.

As illustrated in FIG. 3, the improved HTU-R 244 in accordance with the present invention may also comprise a memory device 230, and a DSP 220, in addition to the PSTN interface 210. The DSP 220 may be in communication with the PSTN interface 210 via at least one PSTN bi-directional interface bus 240. As shown in FIG. 3, the DSP 220 may be communicatively coupled to the memory device 230 via at least one memory bus 250. Those skilled in the art will appreciate that the DSP 220 may be configured along with the memory device 230 to provide a plurality of functions to coordinate the transfer of data between the CPE 48 (FIG. 1) and various computing devices interconnected to the PSTN via a CO located HTU-C 24c (FIG. 1).

In accordance with a preferred embodiment, the DSP 220 within the improved HTU-R 244 may comprise a network timing reference unit 300 and at least one sliding window state table 222, 224. As will be explained below in regard to FIG. 4, the network timing reference unit 300 may receive the timing reference signal 275 as well as a series of HDSL frames. The network timing reference unit 300 may be configured to apply the delete and stuffing bits D1, D2, S1, and S2 as indicated in at least one of the sliding window state tables 222, 224, respectively. Those skilled in the art will appreciate that in an alternative embodiment, the sliding window state table(s) 222, 224 may be stored in the memory device 230 for retrieval and application as required by the DSP 220. As shown in FIG. 3, the first sliding window state table 222 may be appropriate for application with HDSL communication systems configured to apply CAP modulation.

Figure 4:
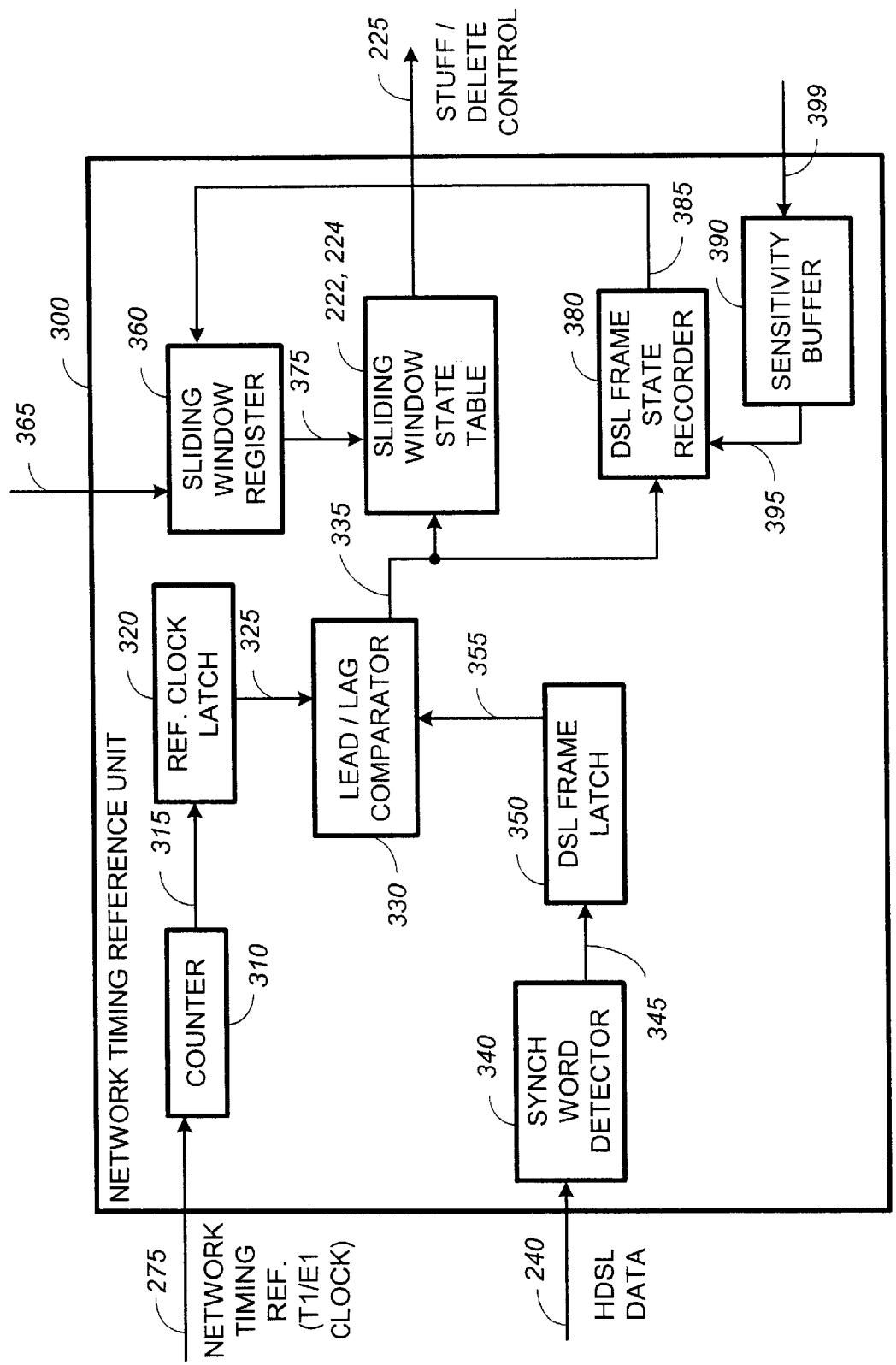
FIG. 4 is a functional block diagram illustrating a network timing reference unit of the improved HDSL transmission unit of FIG. 3.

Whereas, the second sliding window state table 224, may be appropriate for application with HDSL communication systems configured to apply 2B1Q data modulation (e.g., the exemplary HDSL frame structure of FIG. 2). Having introduced and described an improved HTU-R 244 in accordance with the present invention with regard to FIG. 3, reference is now directed to FIG. 4, which illustrates a functional block diagram of a network timing reference unit 300 of the improved HTU-R 244 (FIG. 3). As illustrated in FIG. 4, a network timing reference unit (NTRU) 300 may receive a sliding window register input 365, a sensitivity buffer input 399, a timing reference signal 275 (e.g., the T1/E1 clock), and a HDSL data input 240. As also illustrated in FIG. 4, the NTRU 300 may generate a stuff/delete control output signal 225. As shown in FIG. 4, the NTRU 300 may comprise a counter 310, a reference clock latch 320, a lead/lag comparator 330, a synchronization word detector 340, a DSL frame reference latch 350, a sliding window register 360, a sensitivity buffer 390, a DSL frame state recorder 380, and the sliding window state table 222, 224 (see FIG. 3). Those skilled in the art will appreciate that alternatively, the sliding window state table 222, 224 may be stored in the memory 230 rather than within the NTRU 300.

As also shown in FIG. 4, the sliding window register input 365 may be coupled to the sliding window register 360 to select an initial sliding window (i.e., window 1, 2, 3, or 4) for the NTRU 300. Similarly, the sensitivity buffer input 399 may be coupled to the sensitivity buffer 390 in order to store a sensitivity threshold, M. As will be explained later with regard to flowchart of FIGS. 5A and 5B, the sensitivity threshold, M, may represent the number of consecutive DSL frames that must have the same lead/lag state before a new sliding window (e.g., an adjacent window) is selected for directing the application of stuff/delete bits to DSL frames. As illustrated in FIG. 4, the timing reference signal 275 may be coupled to an input of the counter 310. In accordance with a preferred embodiment, the counter 310 may be configured to trigger a reference clock latch input signal 315 upon receipt of the $X^{th}$ clock transition. Having received an indication that the $X^{th}$ clock transition has occurred, the reference clock latch 320 may be configured to indicate the same via a first lead/lag comparator input 325. As also illustrated in FIG. 4, the HDSL data input 240 may be coupled to an input of the synchronization word detector 340. The synchronization word detector 340 may be configured to trigger a DSL frame latch input 345 upon receiving a synchronization word within the DSL data stream. Having received an indication that the DSL frame. synchronization word for the next DSL frame has been processed, the DSL frame latch 350 may be configured to indicate the same via a second lead/lag comparator input 355. In turn, the lead/lag comparator 330 may receive the first and second lead/lag comparator inputs 325, 355, respectively, and may be configured to provide an output signal 335 that indicates whether the DSL frame synchronization word is leading or lagging the timing reference signal 275.

As illustrated in FIG. 4, the sliding window state table 222, 224 may receive a sliding window register input signal 375 indicative of the current sliding window (1 through 4) that is to be applied for selecting the stuff/delete bits. In addition, the sliding window state table 222, 224 may be configured to receive the lead/lag comparator output signal 335. Together, the lead/lag comparator output signal 335 and the sliding window register input signal may identify the appropriate stuff/delete bits to be applied to the DSL frame to correct the relative timing of the DSL frame to the timing reference signal 275. As shown in the schematic of FIG. 4, the sliding window state table 222, 224 may be configured to supply the stuff/delete bits via the stuff/delete control signal 225. It will be appreciated by those skilled in the art that the counter 310, the reference clock latch 320, the lead/lag comparator 330, the synchronization word detector 340 and the DSL frame reference latch 350 may be reset at any time after the sliding window table 222, 224 has sent the stuff/delete control output signal 225.

As further illustrated in the schematic of FIG. 4, the sensitivity buffer 390 may be configured to apply an indicator of a desired sliding window control sensitivity threshold via output 395 to the DSL frame state recorder 380. As illustrated in the schematic of FIG. 4, the DSL frame state recorder 380 may also be configured to receive the lead/lag comparator output signal 335 from the lead/lag comparator 330. In accordance with a preferred embodiment, the DSL frame state recorder 380 of the NTRU 300 may be configured to wait until it receives M consecutive lead or conversely M consecutive lag signals before sending an indicator of a new desired sliding window to the sliding window register 360 via the DSL frame state recorder output 385. As will become apparent during the description of the flowchart of FIGS. 5A and 5B below, if the DSL frame state recorder 380 indicates that the DSL frame is lagging behind the timing reference signal 275 for M consecutive frames, the sliding window will be incremented (i.e., the sliding window may transition from sliding window "2" to sliding window "3.") Conversely, if the DSL frame state recorder 380 indicates that the DSL frame is leading the timing reference signal 275 for M consecutive frames, the sliding window will be decremented (i.e., the sliding window may transition from sliding window "2" to sliding window "1.")

Figure 5A:
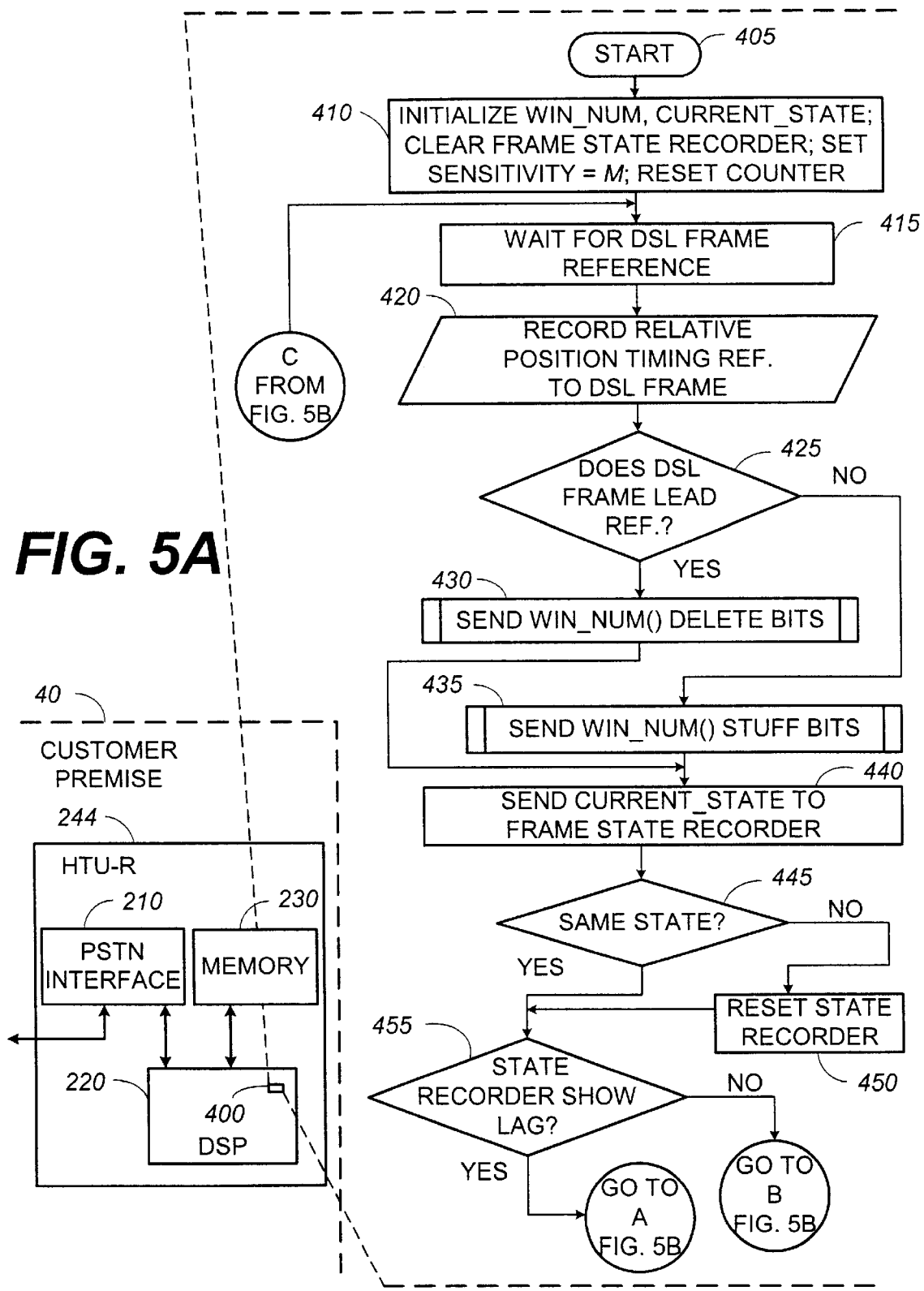
FIGS. 5A and 5B are a flowchart illustrating a method for reducing transmit carrier wander as may be practiced by the network timing reference unit of FIG. 4.
Figure 5B:
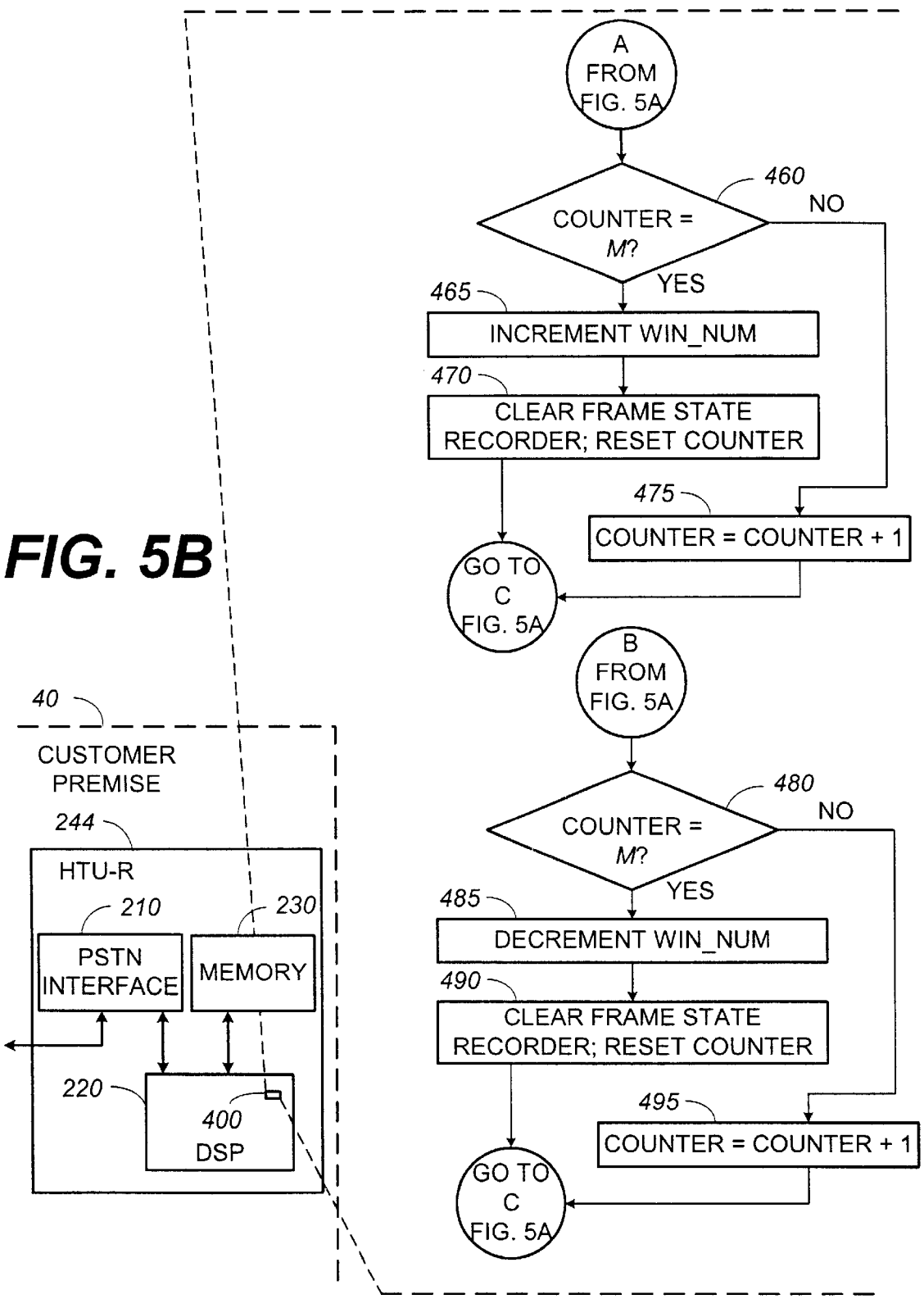

Having introduced and described a network timing reference unit 300 that may be implemented within an improved HTU-R 244 with regard to FIG. 4, reference is now directed to FIGS. 5A and 5B, which present a flowchart illustrating a method for reducing transmit carrier wander that may be performed by the network timing reference unit 300 of FIG. 4. In this regard, a method for reducing transmit carrier wander 400 may begin with step 405, herein designated as "Start." Next, in step 410, the method for reducing transmit carrier wander 400 may be configured to initialize at least two variables herein designated, "WIN_NUM" and "CURRENT_STATE," respectively. In addition, a frame state recorder 380 (FIG. 4) may be cleared, a sliding window control sensitivity threshold, M, may be set, and a counter may be reset to 0. The method for reducing transmit carrier wander 400 may proceed by waiting for a DSL frame reference point as indicated in step 415. As described above with regard to the NTRU 300 of FIG. 4, a synchronization word (see FIG. 2) or other readily identifiable portion of the DSL data frame may serve as the DSL frame reference point. Once the DSL frame reference point has been received, the method for reducing transmit carrier wander 400 may record the relative position of a timing reference signal to the DSL frame reference point as illustrated in step 420.

Having recorded the relative position of the timing reference signal to the DSL frame reference point, the method for reducing transmit carrier wander may be configured to determine if the DSL frame reference point leads the timing reference signal, as illustrated in the query of step 425. If the query of step 425 indicates that the DSL frame reference leads the timing reference signal, as shown by the affirmative branch from step 425, the method for reducing transmit carrier wander 400 may be configured to apply the delete bits in accordance with the sliding window state table 222, 224 of FIG. 3 to the HDSL frame 100 of FIG. 2 as shown in step 430. Otherwise, if the query of step 425 indicates that the DSL frame reference lags the timing reference signal, as shown by the negative branch from step 425, the method for reducing transmit carrier wander 400 may be configured to insert the stuffing bits in accordance with the sliding window state table 222, 224 of FIG. 3 to the HDSL frame 100 of FIG. 2, as illustrated in step 435.

Next, the method for reducing transmit carrier wander 400 may be configured to send the current state of the relative position of the DSL frame reference to the timing reference to a DSL frame state recorder 380 (FIG. 4) as indicated in step 440. As illustrated in step 445 of the flowchart of FIG. 5A, the method for reducing transmit carrier wander 400 may proceed by making a determination if the DSL frame state recorder 380 (FIG. 4) indicates that the DSL frame reference point has remained at the same state for two consecutive DSL frames. If the query of step 445 is negative, the method for reducing transmit carrier wander 400 may perform step 450, where the DSL frame state recorder 380 (FIG. 4) is reset. If the determination in the query of step 445 is affirmative, the method for reducing transmit carrier wander 400 may be configured to perform step 455, where a query may be performed to determine is the DSL frame reference point is lagging behind the timing reference signal. As illustrated in the flowchart of FIG. 5A, if the determination in the query of step 455 is affirmative, the method for reducing transmit carrier wander 400 may continue with flowchart connector, "A" on FIG. 5B. Otherwise, if the determination in the query of step 455 is negative, the method for reducing transmit carrier wander 400 may continue with flowchart connector "B" on FIG. 5B.

As illustrated in the flowchart of FIG. 5B, if the method flow from FIG. 5A arrives at flowchart connector "A," the method for reducing transmit carrier wander 400 may proceed by checking if the frame state counter has reached the sliding window control sensitivity threshold, M, as illustrated in step 460. If the determination in the query of step 460 is affirmative, the method for reducing transmit carrier wander 400 may be configured to increment the sliding window number as indicated in step 465. Next, the method for reducing transmit carrier wander 400 may be configured to clear the DSL frame state recorder 380 (FIG. 4) and reset the frame state counter as indicated in step 470. Otherwise, if the determination in the query of step 460 is negative, the method for reducing transmit carrier wander 400 may be configured to perform step 475, where the frame state counter may be incremented by one. Having determined that the DSL frame reference point is lagging behind the timing reference signal and having reacted appropriately, the method for reducing transmit carrier wander 400 may proceed by continuing at flowchart connector "C" on FIG. 5A. As revealed in the flowchart of FIGS. 5A and 5B, steps 415 through 475 may be repeated as previously described.

As illustrated in the flowchart of FIG. 5B, if the method flow from FIG. 5A arrives at flowchart connector "B," the method for reducing transmit carrier wander 400 may proceed by checking if the frame state counter has reached the sliding window control sensitivity threshold, M, as illustrated in step 480. If the determination in the query of step 480 is affirmative, the method for reducing transmit carrier wander 400 may be configured to decrement the sliding window number as indicated in step 485. Next, the method for reducing transmit carrier wander 400 may be configured to clear the frame state recorder and reset the frame state counter as indicated in step 490. Otherwise, if the determination in the query of step 480 is negative, the method for reducing transmit carrier wander 400 may be configured to perform step 495, where the frame state counter may be incremented by one. Having determined that the DSL frame reference point is leading the timing reference signal and having reacted appropriately, the method for reducing transmit carrier wander 400 may proceed by continuing at flowchart connector "C" on FIG. 5A. As illustrated in the flowchart of FIGS. 5A and 5B, steps 415 through 455 and 480 through 495 may be repeated as previously described.

Any process descriptions or blocks in the flowchart of FIGS. 5A and 5B should be understood to represent modules, segments, or portions of code which include one or more executable instructions for implementing specific logical functions or steps in the process for reducing transmit carrier wander in a DSL transceiver. Alternate implementations are included within the scope of the preferred embodiment of the present invention in which functions may be executed out of order from that shown or discussed, including substantially, concurrently, or in reverse order, depending on the functionality involved, as would be understood by those reasonably skilled in the art of the present invention.

It will be appreciated that the method for reducing transmit carrier wander 400 in accordance with the present invention may comprise an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A system for synchronizing a digital data stream to an external reference clock, comprising:
   a counter configured to receive a clock reference signal and to provide a first counter output responsive to a predetermined number of periods encountered in the received network clock reference signal;
   a data frame synchronization detector configured to receive a data stream and generate a data frame reference output responsive to a particular item in each subsequent frame in the data stream;
   a first comparator coupled to receive the first counter output and the data frame reference output, the first comparator configured to generate an output indicative of which of the first counter output or the data frame reference signal arrived first;
   a sliding window state table coupled to receive the first comparator output and a sliding window control input indicative of an active sliding window, the sliding window state table configured to generate a predetermined bit-manipulation output responsive to the first comparator output and the sliding window control input, wherein the sliding window state table comprises an array of N windows and a plurality of options associated with each of the N windows; and
   a frame state recorder coupled to receive the first comparator output and a sliding window sensitivity threshold value, the frame state recorder configured to adjust the active current sliding window in response to receiving the same value from the first comparator output for a number of data frames equal to the sliding window sensitivity threshold.

2. The system of claim 1, wherein the counter is a modulo X up-counter.

3. The system of claim 1, wherein the data frame synchronization detector is configured to generate the data frame reference output upon encountering a synchronization word embedded in the data stream.

4. The system of claim 1, wherein the sliding window state table driven bit-manipulation option comprises applying bits corresponding to the active sliding window.

5. The system of claim 1, wherein the sliding window state table driven bit-manipulation option comprises applying delete bits corresponding to the active sliding window.

6. The system of claim 1, wherein the sliding window state table driven bit-manipulation option comprises applying stuff bits corresponding to the active sliding window.

7. The system of claim 1, wherein the sliding window state table driven bit-manipulation option comprises applying a range of delete bits from zero to three.

8. The system of claim 1, wherein the sliding window state table driven bit-manipulation option comprises applying a range of stuff bits from one to four.

9. The system of claim 1, wherein the sliding window state table comprises an array of 2 sliding windows associated with delete and stuff bits suited to 2B1Q modulated data.

10. The system of claim 1, wherein the sliding window state table comprises an array of 4 sliding windows associated with delete and stuff bits suited to carrierless amplitude/phase (CAP) modulated data.

11. The system of claim 5, wherein the delete bits are applied when the data frame leads the timing reference.

12. The system of claim 6, wherein the stuff bits are applied when the data frame lags the timing reference.

13. A system for controlling a digital data stream, comprising:
   means for receiving an external reference clock signal;
   means for receiving a digital data stream;
   means for identifying an external clock signal reference point;
   means for identifying a digital data stream frame reference point;
   means for comparing whether the digital data stream reference point leads the external clock signal reference point;
   means for determining a sliding window position; and
   means for performing bit manipulation on the digital data stream responsive to the comparing means and the determining means for reducing the relative position between the digital data stream reference point and the external reference clock signal.

14. The system of claim 13, further comprising:
   means for recording the result of the comparing means for a plurality of data frames;
   means for deciding if the result of the comparing means has remained constant for at least a predetermined minimum number of consecutive data frames; and
   means for adjusting the sliding window in response to the deciding means.

15. The system of claim 13, wherein the means for identifying an external clock signal reference point comprises a counter.

16. The system of claim 13, wherein the means for identifying an external clock signal reference point comprises a modulo X up-counter.

17. The system of claim 13, wherein the means for identifying a digital data stream frame reference point comprises a synchronization word detector.

18. The system of claim 13, wherein the comparing means comprises a reference clock signal latch, a digital data stream frame reference latch, and a comparator.

19. The system of claim 13, wherein the bit manipulation means comprises a sliding window state table.

20. The system of claim 14, wherein the recording means comprises a shift register.

21. The system of claim 14, wherein the deciding means comprises a plurality of latches and at least one AND logic gate.

22. The system of claim 14, wherein the adjusting means comprises an up/down counter.

23. A method for reducing transmit carrier wander in a digital data transceiver, comprising:

receiving an external reference clock signal and a digital data stream, the digital data stream comprising a plurality of frames;

identifying a reference point on the external clock signal;

identifying a frame reference point;

identifying the relative position of the frame reference point to the external clock reference point;

adjusting a current window position in response to a consistent relative reference position over time; and applying bits in the digital data stream responsive to the relative position and the current window position.

24. The method of claim 23, wherein the step of applying comprises applying bits corresponding to the current window, where the bits applied are identified in a state table.

25. The method of claim 23, wherein the step of applying comprises applying delete bits corresponding to the current window.

26. The method of claim 23, wherein the step of applying comprises applying stuff bits corresponding to the current window.

27. The method of claim 23, wherein the step of applying comprises applying a range of delete bits from zero to three.

28. The method of claim 23, wherein the step of applying comprises applying a range of stuff bits from one to four.

29. The method of claim 23, wherein the step of applying is responsive to a plurality of sliding windows associated with respective delete and stuff bits suited to 2B1Q modulated data.

30. The method of claim 23, wherein the step of applying is responsive to a plurality of sliding windows associated with delete and stuff bits suited to carrierless amplitude/phase (CAP) modulated data.

31. The method of claim 27, wherein the delete bits are applied when the frame reference point leads the external reference clock.

32. The method of claim 28, wherein the stuff bits are applied when the frame reference point lags the external reference clock.

\* \* \* \* \*